Aug. 23, 1960

P. E. SEIFRIED ET AL
ELECTRICAL FAULT WARNING DEVICE FOR
A REMOTE ELECTRICALLY OPERATED
CONDITION INDICATOR 2,950,460

Filed Nov. 14, 1956

INVENTORS
PAUL E. SEIFRIED
WILLIAM U. HENRICH

BY *Hubert L. Davis*

ATTORNEY

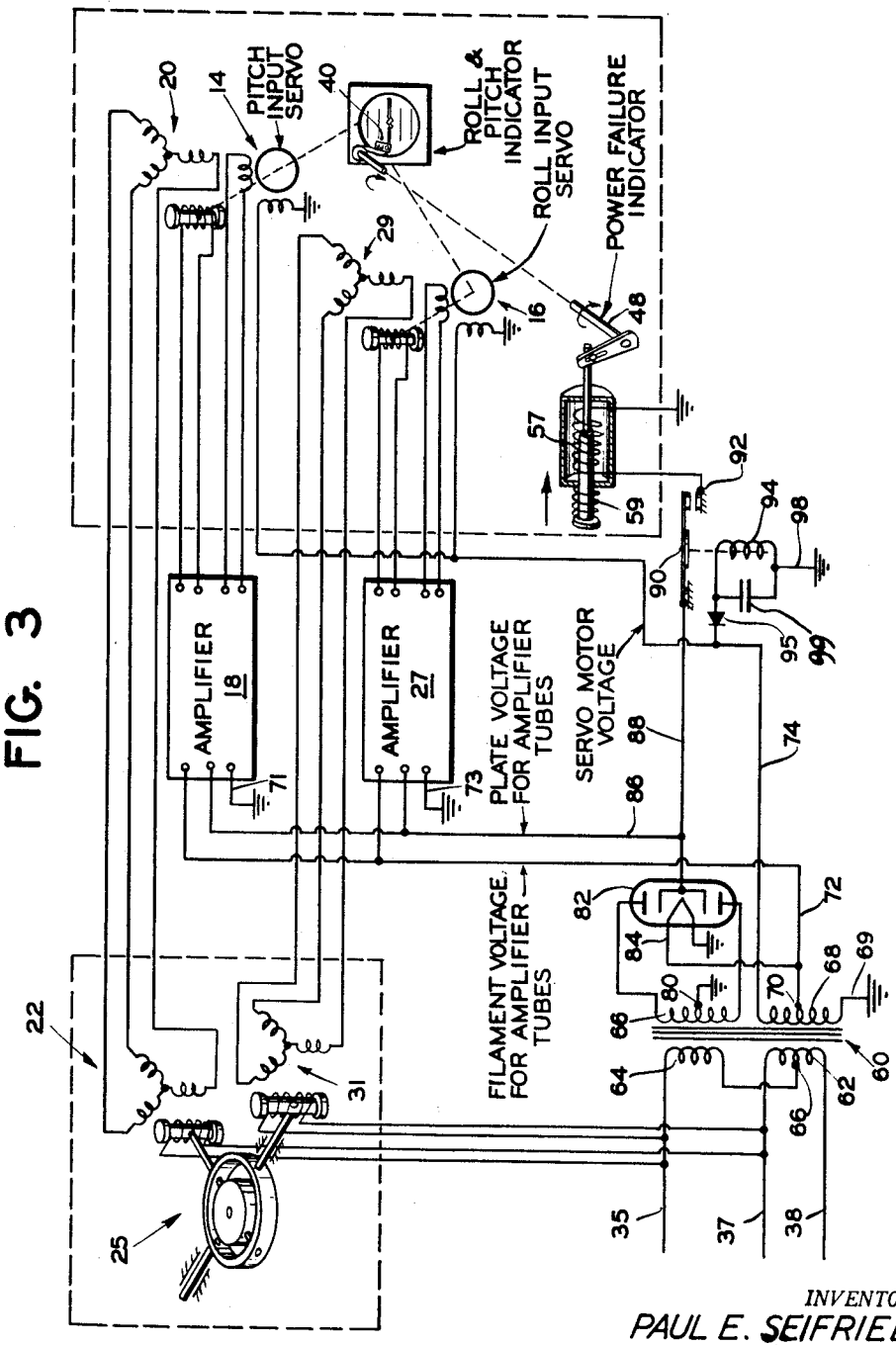

United States Patent Office 2,950,460
Patented Aug. 23, 1960

2,950,460

ELECTRICAL FAULT WARNING DEVICE FOR A REMOTE ELECTRICALLY OPERATED CONDITION INDICATOR

Paul E. Seifried, New City, N.Y., and William U. Henrich, Cedar Grove, N.J., assignors to The Bendix Corporation, a corporation of Delaware Filed Nov. 14, 1956, Ser. No. 622,222

2 Claims. (Cl. 340—27)

The invention relates to indicating devices for electrical apparatus and more particularly to a device for indicating a failure in the supply of electrical energy to a remote electrical indicator system in an aircraft and to improvements in a fault warning device of a type such as disclosed and claimed in U.S. Patent No. 2,664,558, granted December 29, 1953 to Henry Konet and Paul E. Seifried and assigned to Bendix Aviation Corporation, so as to provide an electrical fault warning device in an electrically operated indicator remote from the aircraft condition sensing unit of the system.

An object of the invention is to provide means to effect immediate signalling to the operator of an aircraft of a power interruption or partial power failure with respect to any phase of a polyphase supply voltage for a remote flight condition indicator.

Another object of the invention is to provide a novel power failure indicating means for use in a remote electrical attitude indicating system of an aircraft.

The invention contemplates providing a solenoid having a single winding, the energization of which is controlled by a relay sensitive to the operating condition of all phases of a polyphase voltage supply system. The solenoid is suitably connected to a warning device visible to the operator of the craft at the remotely positioned indicator so that upon an interruption or a partial failure in the electrical energy supplied through any one of the polyphase electrical power supply lines for the system, the warning device is brought into view. During normal uninterrupted operation of the supply lines, the warning device is held out of view by the operation of the solenoid controlled by the relay in response to the sensed operating condition of the polyphase voltage supply system.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description, and are not to be construed as defining the limits of the invention.

In the drawings:

Figure 3 is a detailed schematic view illustrating the remote attitude indicating system in which the present invention is designed for use.

Figure 1:
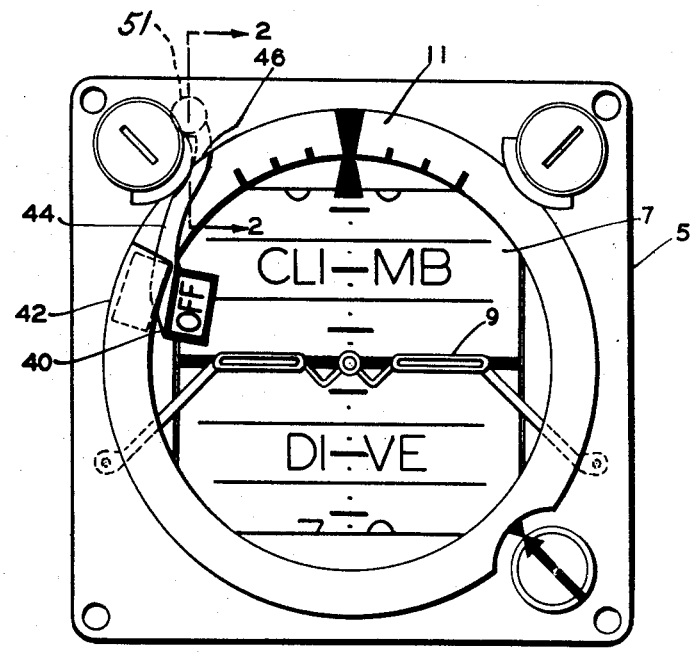
Figure 1 is a front plan view of a typical attitude indicating instrument embodying the invention.

Referring now to the drawings for a more detailed description of the novel power failure indicator of the present invention, the device is shown in Figure 1 as incorporated in a remote attitude indicator having a housing 5 and a calibrated face or mask 7 operable by suitable mechanism in the housing 5. Such operating mechanism, not shown, is effective to rotate the mask 7 up or down relative to an horizon bar 9 to indicate the pitch of the craft and to rotate the mask 7 clockwise or counter-clockwise relative to suitable indicating means 11 on the face of the housing to indicate the roll attitude of the craft. Thus, the attitude of the aircraft embodying the instrument is respectively and realistically presented to the pilot.

The mechanism to effect the aforenoted operation of the mask 7 may be of conventional type or the pitch and roll indicator mechanism may be of a type such as disclosed and claimed in copending application Serial No. 543,154 filed October 27, 1955 by Robert H. Lickel et al. and assigned to Bendix Aviation Corporation.

As is well known in the art, the operating mechanism for the remote pitch and roll indicator may include separate synchro drive motors 14 and 16, shown schematically in Figure 3, in which the motor 14 serves as a pitch input servo and motor 16 serves as a roll input servo.

The pitch input motor 14, as shown in Figure 3, is controlled through a synchro repeater system including a vacuum tube amplifier 18 of conventional type, a receiver synchro 20, and a transmitter synchro 22 responsive to the pitch attitude of an aircraft as sensed by a remotely located vertical gyro 25 of conventional type. The synchro 22 has a rotor element associated with the pitch axis of the gyro 25 and is arranged in conventional manner to provide a signal through the amplifier 18 to the control winding of the servo motor 14 which, in turn, gives an appropriate adjustment to the rotor of the receiver synchro 20 and the mask 7 of the indicator mechanism so as to indicate the pitch attitude of the aircraft.

Similarly, the roll input servo motor 16 is operatively controlled through a suitable vacuum tube amplifier 27 of conventional type, a receiver synchro 29 and transmitter synchro 31 forming a separate synchro repeater system. The rotor of synchro 31 is associated with the bank or roll axis of the remotely located vertical gyro 25 so as to provide a signal through the amplifier 27 to the control winding of the roll input servo motor 16 which, in turn, through the motor 16 gives an appropriate adjustment to the rotor of the receiver synchro 29 and the mask 7 of the indicator mechanism so as to indicate the roll attitude. Thus, the servo motors 14 and 16 appropriately adjust the mask 7 so as to indicate the pitch and roll attitude of the aircraft as sensed by the remotely located vertical gyro 25.

Electrical energy is supplied by polyphase supply lines 35, 37 and 38 from a suitable source, not shown, for the excitation of the motor windings of the respective transmitter synchros 22 and 31 as well as providing the filament voltage and plate voltage of the amplifier tubes of the amplifiers 18 and 27, and the voltage for the fixed phase windings of the servo motors 14 and 16 which may be of the conventional two-phase type. Any interruption or excessive partial failure in the electrical energy supplied through any one of these polyphase supply lines 35, 37 and 38 may well cause a serious failure in the proper operation of the pitch and roll indicator.

In order that such an interruption or partial power failure as to any phase of the polyphase supply voltage may be immediately brought to the attention of the operator of the craft, there is provided a signal device 40, shown in effective position in Figure 1 and diagrammatically in Figure 3. The visual indication of power failure is the small metal flag 40 operated by a novel control mechanism so as to be visible on the face of the remote attitude indicator when the electrical power supply is being interrupted for any reason. When the unit is operating properly and there is no interruption or excessive partial failure in any phase of the three-phase supply voltage, the flag 40 is retracted by operation of the control mechanism to a position, indicated in Figure 1 by dotted lines, behind a portion 42 of the surrounding rim of the dial so as to be visually ineffective.

Figure 2:
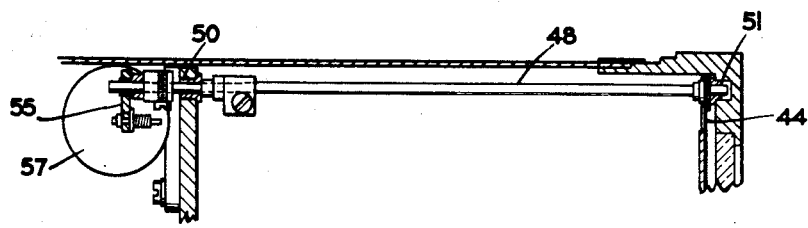
Figure 2 is a fragmentary sectional view of Figure 1 taken along the lines 2—2 and looking in the direction of the arrows to show the operating linkage and shaft for the warning device and electromagnetic actuator or solenoid for operating the same.

The positioning of the flag 40 is effective through an arm 44 extending under a portion 46 of the outer frame of the housing to a rotatable rod 48, as shown in Figure 2, and which rod is rotatably mounted in bearings 50 and 51 and rotated through a linkage 55 by a solenoid 57 to effect the movement of the flag 40 from the position shown in Figure 1 to the retracted position indicated by dotted lines in Figure 1 behind the shielding edge 42 of the dial. Upon deenergization of the solenoid 57, a spring 59, shown schematically in Figure 3, is effective to move the flag 40 from the retracted position to the effective visual position indicated in Figures 1 and 3.

As shown in Figure 3, electrical energy is provided for operating the solenoid 57 from the polyphase supply lines 35, 37 and 38 through a transformer 60. The transformer 60 has a primary winding 62 connected to lines 37 and 38 and a second primary winding 64 connected to line 35 and to a center tap 66 on the primary winding 62. Primary winding 64 is inductively coupled to a secondary winding 66, while the winding 62 is inductively coupled to a secondary winding 68 having one end connected to ground by a conductor 69 and a center tap 70 connected by a conductor 72 so as to provide filament voltage for the amplifier tubes of the amplifiers 18 and 27 which have return line grounded connections 71 and 73, respectively. An opposite end of the secondary winding 68 is connected by a conductor 74 to a fixed phase winding of the two-phase servo motors 14 and 16. The variable phase control windings for the servo motors 14 and 16 are connected to the outputs of the amplifiers 18 and 27, respectively.

The secondary winding 66 of the transformer 60 is grounded at a center tap 80, while the opposite ends of the secondary winding 66 are connected to opposite input plates of a suitable rectifier tube 82 of conventional type. The rectifier tube 82 has a filament or heater having a grounded connection 83 and supplied with filament voltage through a conductor 84 leading from the line 72. There are further provided suitable cathode elements in the tube 82 and an output line 86 leading from the cathode elements for supplying a plate voltage for the amplifier tubes of the respective amplifiers 18 and 27 having the conventional return line grounded connections 71 and 73, respectively.

Excitation of the winding 57 of the electromagnetic actuator is provided through a line 88 leading from the line 86 and through a resilient switch arm 90 cooperating with a contact 92 connected to the winding 57. The resilient switch arm 90 is normally biased to an open circuit position and is arranged to close the contact 92 upon sufficient energization of a suitable electromagnetic means or control relay winding 94. The control relay winding 94 is connected through a rectifier 95 or silicon junction diode to the conductor 74 leading from the secondary winding 68 and through a grounded connection 98 of the winding 94 across the secondary winding 68. A filter capacitor 99 is connected across winding 94.

The relay winding 94 is so arranged that during the normal supply of electrical energy through the polyphase electrical power supply lines 35, 37 and 38, the winding 94 will cause the relay switch to close contact 92 and, in turn, cause energization of the actuator 57 rotating the shaft 48 in the direction of the arrow, as viewed in Figure 3, so as to retract the warning device 40 from its visually effective position.

An interruption in the electrical energy supplied through line 35 will, of course, cause a deenergization of the winding 57 of the electromagnetic actuator so as to cause spring 59 to bias the warning device 40 into the visual effective position shown in Figures 1 and 3. The arrangement, however, is such that either an interruption or a partial failure below a predetermined value in the electrical energy in any of the supply lines 35, 37 and 38 will act through the transformer 60 to sufficiently decrease the energization of the relay winding 94 connected across the winding 68 to cause the resilient switch arm 90 to open contact 92 under the resilient biasing force thereof, resulting in a complete deenergization of the winding 57 of the electromagnetic actuator and the resulting movement of the indicating device 40 to the visually effective position, shown in Figures 1 and 3, through the biasing force of the spring 59.

It will be readily seen from the foregoing that through the novel means herein provided, an interruption or excessive partial failure in any or all of the three phases of the power supply lines 35, 37 and 38 will cause immediate visual signalling by the flag 40 of power failure on the face of the remotely mounted indicator instrument.

Although only one embodiment of the invention has been illustrated and described, various changes in the form and relative arrangement of the parts, which will now appear to those skilled in the art, may be made without departing from the spirit and scope of the invention. Reference is, therefore, to be had to the appended claims for a definition of the limits of the invention.

What is claimed is:

1. Fault indicating apparatus for polyphase electrical power supply lines, said apparatus comprising an electrical current flow responsive electromagnetic actuator, means including a relay switch to operatively control electrical energization of said electromagnetic actuator, electrical voltage responsive electromagnetic means to operate said relay switch, a visual warning device, means operatively connecting said electromagnetic actuator to said warning device so that said electromagnetic actuator may render said warning device visually ineffective upon effective electrical energization of the electromagnetic actuator, spring means to bias the warning device in a sense to render the warning device visually effective upon either ineffective electrical current flow for energization of the electromagnetic actuator or a decrease below a predetermined value in electrical voltage for effecting electrical energization of said electromagnetic means so as to cause said relay switch to effect deenergization of the electromagnetic actuator, a transformer having first and second primary windings, said second primary winding connected across two of said polyphase electrical power lines, said second primary winding having a centertap, said first primary winding connected across another of said polyphase supply lines and the centertap of said second primary winding, first and second secondary windings inductively coupled respectively to said first and second primary windings, rectifying means having an input connected across said first secondary winding and an electrical current output arranged to be operatively connected by the relay switch to the electromagnetic actuator, said second secondary winding having an electrical voltage output, another rectifying means connecting the output voltage of said second secondary winding to the electromagnetic means to cause under predetermined normal voltage conditions said relay switch to connect the current output of said first-mentioned rectifying means across said electromagnetic actuator and thereby render the warning device visually ineffective under a normal current condition resulting from supply of electrical energy through the polyphase electrical power supply lines and first-mentioned rectifying means, said relay switch being alternately operable by said electromagnetic means so as to cause said relay switch to disconnect the current output of the first-mentioned rectifying means from the electromagnetic actuator, whereby upon a decrease below a predetermined value either in the voltage of the electrical energy supplied through any one of the polphase electrical power supply lines and the voltage output to the electromagnetic means or in the current flow supplied through the current output to said electromagnetic actuator the spring means renders the warning device visually effective.

2. Fault indicating apparatus for polyphase electrical power supply lines, said apparatus comprising an electrical current flow responsive electromagnetic actuator, means including a relay switch to operatively control electrical energization of said electromagnetic actuator, an electrical voltage responsive electromagnetic means to operate said relay switch, a visual warning device, means operatively connecting said electromagnetic actuator to said warning device so that said electromagnetic actuator may render said warning device visually ineffective under normal current flow conditions effective to cause electrical energization thereof, and spring means to bias the warning device in a sense to render the warning device visually effective upon a decrease below a predetermined value in the current flow causing electrical energization of said electromagnetic actuator, transformer means including primary windings connected across the polyphase supply lines and secondary windings inductively coupled to the primary windings, said secondary windings having electrical voltage output means and electrical current flow output means, means to connect the voltage output means to the electromagnetic means to cause the relay switch to connect said current flow output means to the electromagnetic actuator under normal voltage conditions and thereby render the warning device visually ineffective during normal current flow conditions of electrical energy through the polyphase electrical power supply lines and said current flow output means to said electromagnetic actuator, and said relay switch being alternately operable by said electromagnetic means so as to cause said relay switch to disconnect said current flow output means from the electromagnetic actuator upon a decrease below a predetermined value either in the voltage condition of the electrical energy supplied through any one of the polyphase electrical power supply lines and voltage output means to said electromagnetic means or in the current flow from said current flow output means to said electromagnetic actuator whereupon the spring means renders the warning device visually effective.

References Cited in the file of this patent

UNITED STATES PATENTS

| | | |
|---|---|---|
| 2,389,613 | De Anthony | Nov. 27, 1945 |
| 2,474,290 | Terry | June 28, 1949 |
| 2,664,558 | Konet et al. | Dec. 29, 1953 |
| 2,671,208 | Lamb | Mar. 2, 1954 |
| 2,700,759 | Ogle | Jan. 25, 1955 |
| 2,709,800 | Temple | May 31, 1955 |
| 2,734,279 | Earley | Feb. 14, 1956 |
| 2,778,004 | Leor et al. | Jan. 15, 1957 |